(12) United States Patent
Darling

(10) Patent No.: US 7,097,314 B1
(45) Date of Patent: Aug. 29, 2006

(54) TWO-IN-ONE WIDE ANGLE AUTOMOBILE MIRROR

(75) Inventor: Sandra M. Darling, Niceville, FL (US)

(73) Assignee: Blue Ridge International Products Company, Freeport, FL (US)

( * ) Notice: Subject to any disclaimer, the term of this patent is extended or adjusted under 35 U.S.C. 154(b) by 0 days.

(21) Appl. No.: 11/117,856

(22) Filed: Apr. 29, 2005

Related U.S. Application Data

(60) Provisional application No. 60/567,103, filed on Apr. 30, 2004.

(51) Int. Cl.
*G02B 7/18* (2006.01)
(52) U.S. Cl. .................................................. 359/872
(58) Field of Classification Search .............. 296/97.5, 296/97.1, 97.4, 97.9; 359/871, 857, 876, 359/872; 248/489–490, 493–495, 497; 297/185, 188.06
See application file for complete search history.

(56) References Cited

U.S. PATENT DOCUMENTS

| | | | | |
|---|---|---|---|---|
| 2,097,419 | A * | 10/1937 | Schmidt | 359/602 |
| 3,790,117 | A | 2/1974 | Winkler | |
| 4,125,244 | A * | 11/1978 | Lukey | 248/475.1 |
| 4,359,266 | A | 11/1982 | Rohlf et al. | |
| 4,702,572 | A * | 10/1987 | Cossey | 359/876 |
| 4,733,956 | A * | 3/1988 | Erickson | 359/863 |
| 4,902,118 | A * | 2/1990 | Harris | 359/871 |
| 4,909,618 | A * | 3/1990 | Gardner | 359/862 |
| 5,103,347 | A * | 4/1992 | Lumbra et al. | 359/871 |
| 5,106,177 | A | 4/1992 | Dolasia | |
| 5,165,081 | A | 11/1992 | Drumheller | |
| 5,285,321 | A | 2/1994 | Nolan-Brown | |
| 5,329,947 | A * | 7/1994 | Shikler | 132/304 |
| 5,576,898 | A * | 11/1996 | Rubin | 359/841 |
| 5,604,633 | A * | 2/1997 | Christianson | 359/507 |
| 5,668,526 | A * | 9/1997 | Collins | 340/326 |
| 6,022,116 | A | 2/2000 | Osborn | |
| 6,026,528 | A | 2/2000 | Pina | |
| 6,039,455 | A | 3/2000 | Sorenson | |
| 6,120,155 | A * | 9/2000 | Brennan et al. | 359/857 |
| 6,217,180 | B1 | 4/2001 | Eisenbraum | |
| 6,220,717 | B1 * | 4/2001 | Pastore | 359/871 |
| 6,252,730 | B1 | 6/2001 | Chabot | |
| 6,283,622 | B1 | 9/2001 | Chupp et al. | |
| 6,305,810 | B1 * | 10/2001 | Mercado | 359/872 |
| 6,354,708 | B1 * | 3/2002 | Monahan et al. | 359/871 |
| 6,478,435 | B1 | 11/2002 | Monahan et al. | |
| 6,485,154 | B1 * | 11/2002 | Nolan-Brown | 359/872 |
| 6,491,403 | B1 * | 12/2002 | Edgar | 359/872 |
| 6,773,123 | B1 | 8/2004 | Hatchett | |
| 6,779,900 | B1 | 8/2004 | Nolan-Brown | |
| 6,824,281 | B1 | 11/2004 | Schofield et al. | |
| 6,857,753 | B1 | 2/2005 | Kane | |
| 2003/0039041 | A1 * | 2/2003 | Darling et al. | 359/872 |

(Continued)

*Primary Examiner*—H Gutman
(74) *Attorney, Agent, or Firm*—Carter Schnedler & Monteith, P.A.

(57) ABSTRACT

A mirror device for use inside a vehicle which includes a front seating area, a rear seating area, a sun visor within the front seating area, and a rear seat within the rear seating area. The rear seat has a top surface. The mirror device includes a mirror having a reflective front surface and a rear surface. The mirror device additionally includes an attachment system configured for attaching the mirror alternatively to the sun visor within the front seating area or generally near the rear seat top surface within the rear seating area.

20 Claims, 8 Drawing Sheets

U.S. PATENT DOCUMENTS

2004/0094588 A1* 5/2004 Klein .................. 224/312

2004/0223242 A1 11/2004 Kim

* cited by examiner

TWO-IN-ONE WIDE ANGLE AUTOMOBILE MIRROR

CROSS-REFERENCE TO RELATED APPLICATION

The benefit of U.S. Provisional Patent Application Ser. No. 60/567,103, filed Apr. 30, 2004 is claimed.

BACKGROUND OF THE INVENTION

The invention relates to attachment systems for mirrors for use in vehicles, particularly for observing infants and children.

The invention disclosed and claimed herein is related to the mirror and attachment system disclosed in Kane U.S. Pat. No. 6,857,753, titled "Panel Attachment System," the entire disclosure of which is hereby expressly incorporated by reference.

SUMMARY OF THE INVENTION

In one aspect, a mirror device for use inside a vehicle is provided. The vehicle includes a front seating area, a rear seating area, a sun visor within the front seating area, and a rear seat within the rear seating area. The rear seat has a top surface. The mirror device includes a mirror having a reflective front surface and a rear surface. The mirror device additionally includes a two-position attachment system including a front seating area attachment subsystem for attaching the mirror to the sun visor within the front seating area and a rear seating area attachment subsystem for attaching the mirror generally near the rear seat top surface within the rear seating area. The front seating area attachment subsystem includes at least one element which is not common to the rear seating area attachment subsystem.

In another aspect, a mirror device for use inside a vehicle is provided. The vehicle includes a front seating area, a rear seating area, a sun visor within the front seating area, and a rear seat within the rear seating area. The rear seat has a top surface. The mirror device includes a mirror having a reflective front surface and a rear surface. The mirror device additionally includes an attachment system which has, for alternative use, at least one clip assembly for attaching he mirror to the sun visor, and a mirror support structure panel employed for attaching the mirror generally near the rear seat top surface within the rear seating area. The clip assembly is not employed when attaching said mirror generally near the rear seat top surface within the rear seating area, and the mirror support structure panel is not employed when attaching the mirror to the sun visor.

DETAILED DESCRIPTION

Figure 1:
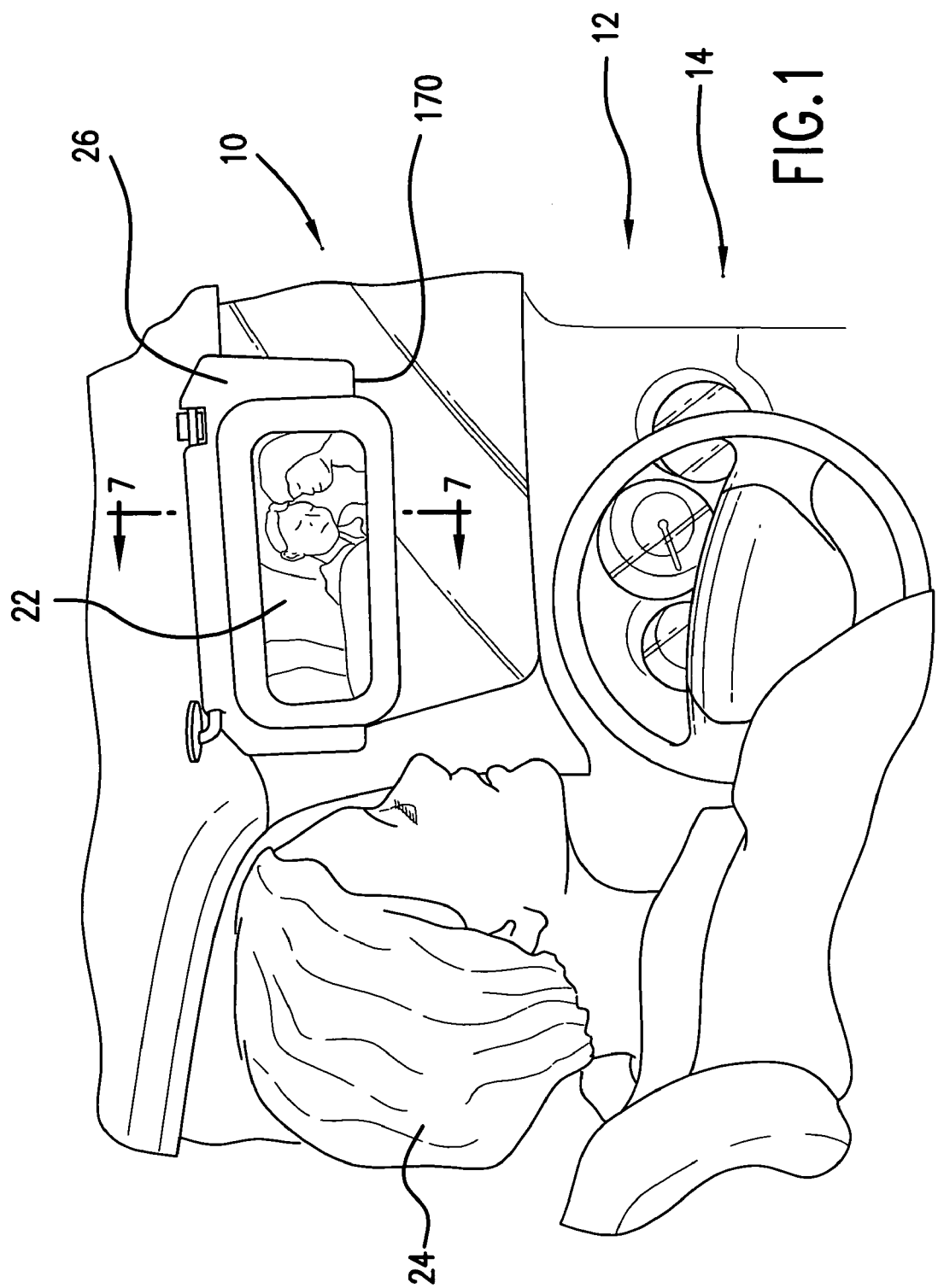
FIG. 1 depicts a wide angle mirror device embodying the invention shown generally attached to an automobile sun visor.
Figure 2:
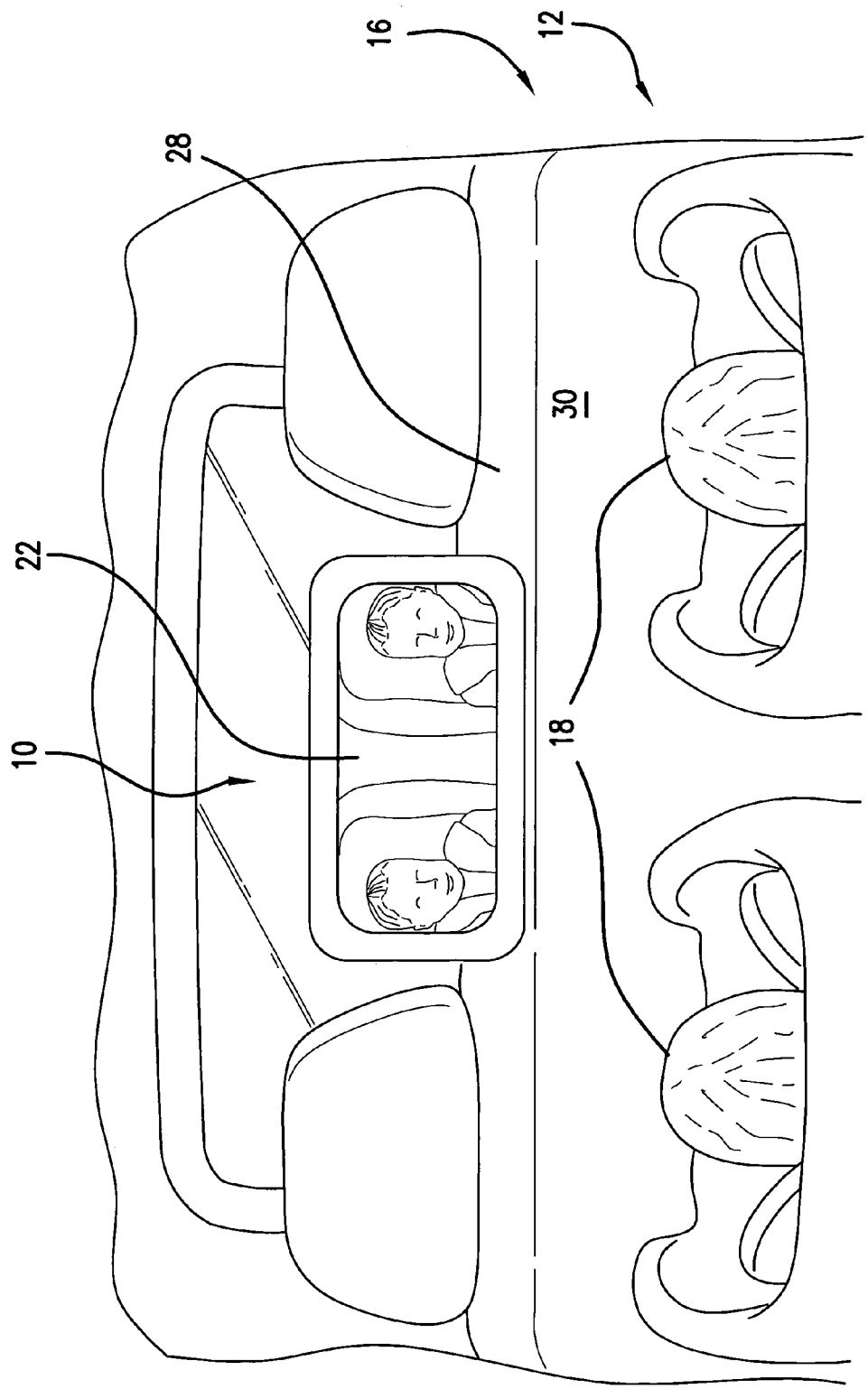
FIG. 2 depicts the wide angle mirror device generally attached near the top of the rear seat of a vehicle so as to enable the driver of the vehicle to observe one or two infants in rear facing child safety car seats.

Referring first to FIGS. 1 and 2, a mirror device 10 embodying the invention is for use inside a motor vehicle 12 having a front seating area 14 (FIG. 1) and a rear seating area 16 (FIG. 2), which vehicle 12 may be employed to transport children 18 in the rear seating area 16. In overview the mirror device 10 includes a convex mirror 22 which enables a driver 24 of the vehicle 12 to view the rear seating area 16 of the vehicle 12. The mirror device 10 can be attached alternatively generally either to a windshield sun visor 26 within the front seating area 14, as in FIG. 1, for observation of children seated in the rear of the vehicle in a forward-facing orientation, such as in a forward-facing car seat; or generally near the top 28 or top surface 28 of a rear seat 30 within the rear seating area 16, as depicted generally in FIG. 2, in such a way that the driver of the vehicle, by looking in the conventional rearview mirror (not shown), can observe, in the mirror 22 attached near the top 28 of the rear seat 30, one or more infants in child safety car seats of the type in which the infant is positioned facing the rear of the vehicle, as is generally disclosed in the above-incorporated Kane U.S. Pat. No. 6,857,753. In other words, the mirror device 10 is convertible between the general attachment position of FIG. 1 and the general attachment position of FIG. 2. In addition, each of these general attachment positions includes a plurality of more specific configurations.

Accordingly, a particular feature or advantage of the mirror device 10 is what may be termed a "Grow With Me" feature. Thus, the mirror device 10 can initially be employed with young infants in rear-facing child safety car seats as generally described hereinbelow with reference to FIGS. 2, 4, 5 and 6. In this situation, the mirror device 10 is attached generally near the rear seat 30 top surface 28 within the rear seating area 16. Later, as a child becomes older and is seated in the vehicle rear seat 30 in a forward-facing position, the mirror device 10 can be clipped to the front seat sun visor 26 within the front seating area 14, as generally described hereinbelow with reference to FIGS. 1, 7 and 8.

Figure 7:
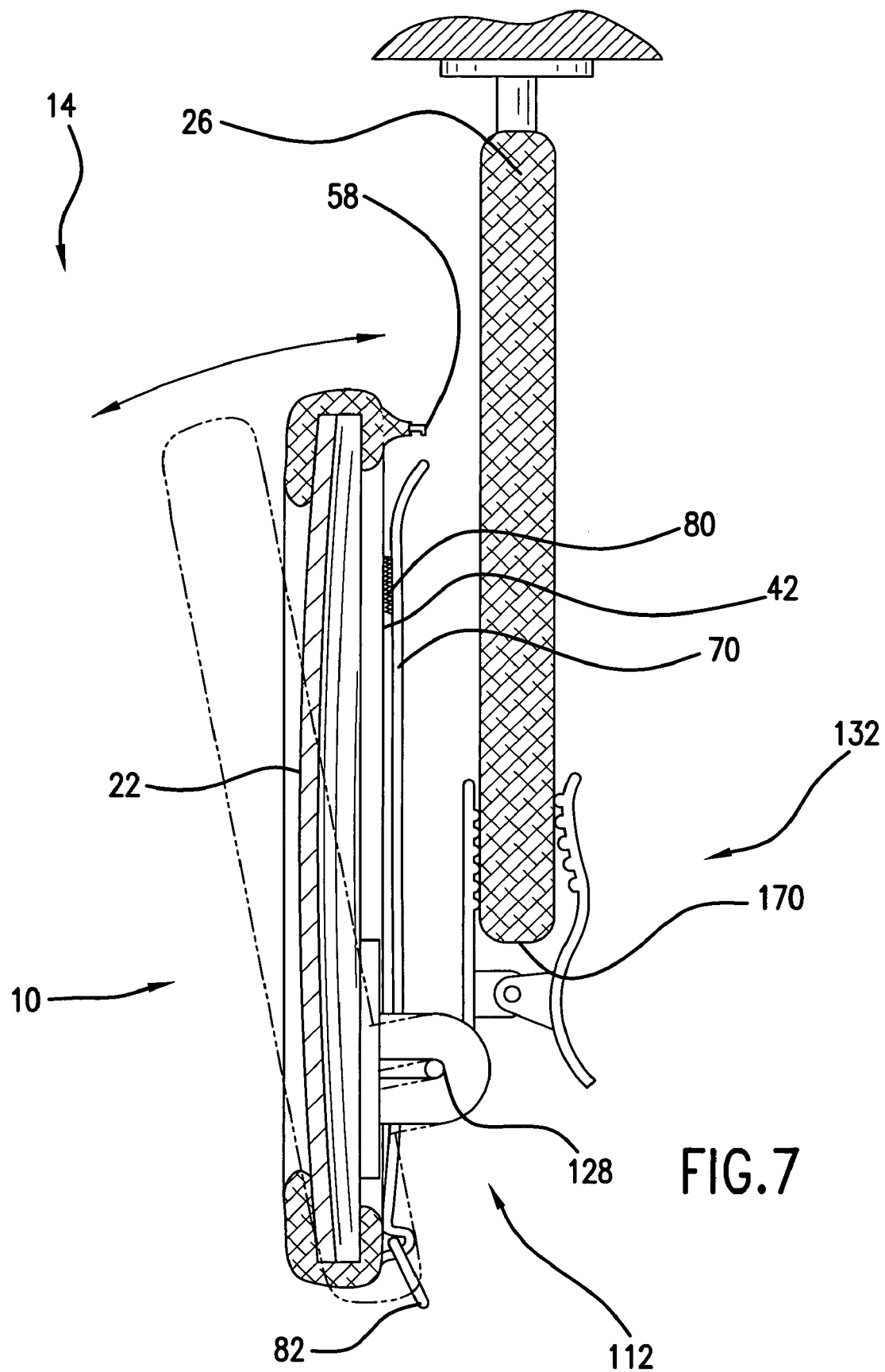
FIG. 7 is a cross-sectional view taken generally on line 7—7 of FIG. 1, which shows in greater detail the manner in which the wide angle mirror device is attached to the automobile sun visor in the sun visor down position.
Figure 8:
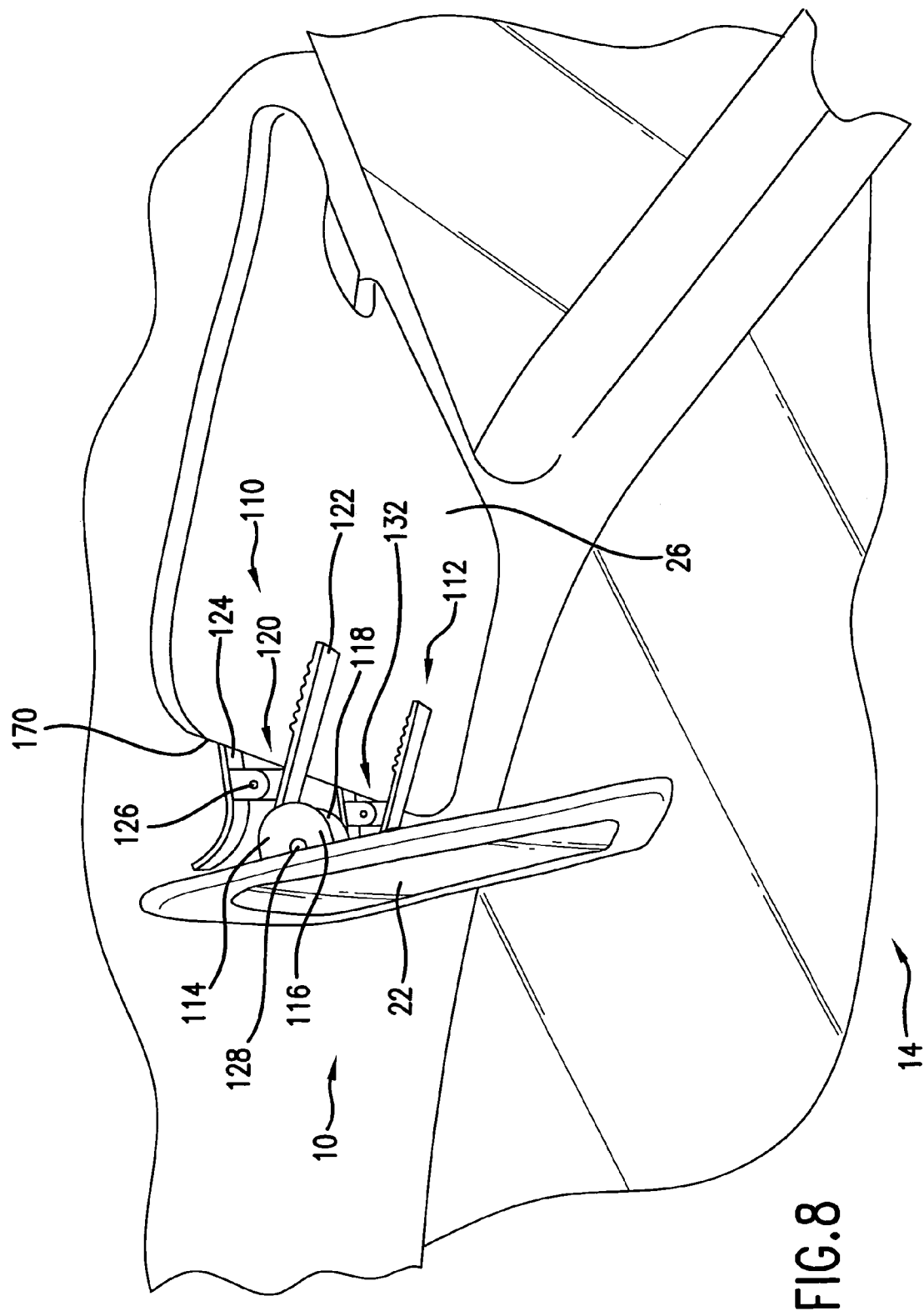
FIG. 8 is a three-dimensional view depicting the wide angle mirror device attached to an automobile sun visor, with the sun visor generally in the sun visor up position.

The mirror device 10 in its position for sun visor 26 attachment has a first configuration in which it is attached to the sun visor 26 in the visor 26 down position as in FIGS. 1 and 7, and a second configuration in which it is attached to the sun visor 26 when the sun visor 26 is generally in its up position as in FIG. 8.

The mirror device 10 in its position generally for attachment near the top 28 of the vehicle rear seat 30, has three different attachment configurations: a "tether attachment" configuration (FIG. 4), a "headrest attachment" configuration (FIG. 5), and a "tuck attachment" configuration (FIG.

6). (The vehicle rear seat 30 is not necessarily the rearmost seat, depending on the particular vehicle configuration. In a conventional automobile, the rear seat 30 is the rearmost seat. Other vehicle configurations have one or more additional rows of seats, and the term "rear seat" as employed herein refers to any such seat which is behind the front seating area of the particular vehicle.)

Figure 3:
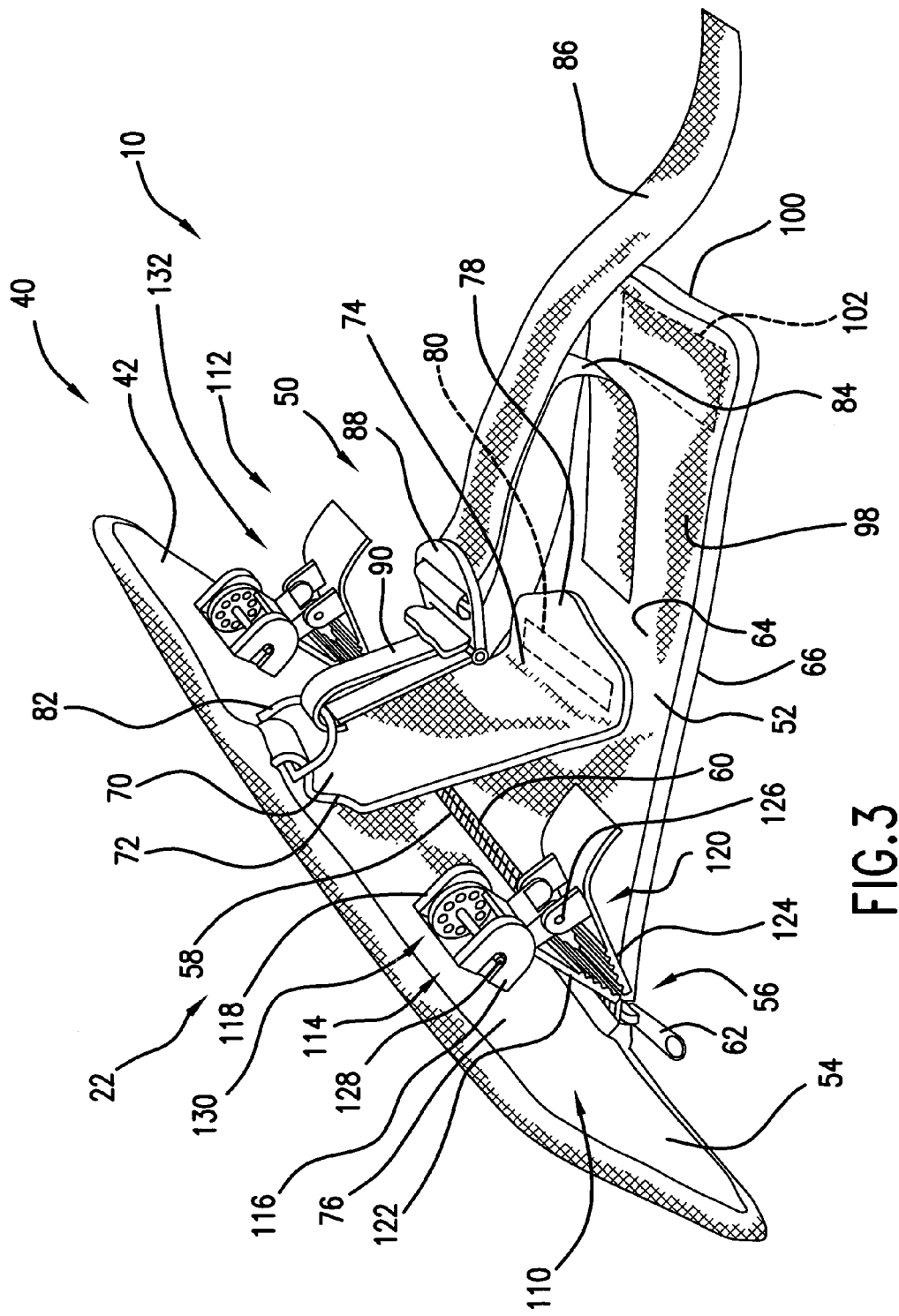
FIG. 3 is a rear respective view of the mirror device.

Referring now particularly to FIG. 3, the mirror device 10 includes a relatively rigid mirror and backing assembly 40. The mirror and backing assembly 40 includes a reflective front surface 22, that is the reflective front surface of the convex mirror 22, and a fabric rear surface 42. More generally, the rear surface 42 may be viewed as the rear surface of the mirror 22. The mirror and backing assembly 40 may include other elements, such as a core of polyurethane foam (not shown). The mirror and backing assembly 40 is generally vertical during use, although not exactly so, since the mirror 22 is positioned at an appropriate angle for best viewing.

As part of a support structure generally designated 50, a bottom panel 52 is removably attached to the mirror and backing assembly 40 generally on the rear surface 42 on a lower portion 54 thereof. As described hereinbelow, the bottom panel 52 is employed when the mirror device 10 is attached generally near the rear seat 30 top surface 28 within the rear seating area 16. The bottom panel 52 may be viewed as part of a rear seating area attachment subsystem. Particular alternative configurations are the "tether attachment" configuration described hereinbelow with reference to FIG. 4, the "headrest attachment" configuration described hereinbelow with reference to FIG. 5, and the "tuck attachment" configuration described hereinbelow with reference to FIG. 6. On the other hand, the bottom panel 52 is removed when the mirror device 10 is attached to the sun visor 26 within the front seating area 14.

In the illustrated embodiment, removability of the bottom panel is accomplished by providing a zipper 56, having two rows 58 and 60 of interlocking teeth, as well as a zipper pull 62. Alternatives to the zipper 56 include a hook-and-loop fastener (not shown). Accordingly, the bottom panel 52 is capable of being repeatedly attached to and removed from the mirror and backing assembly 40, and thus from the mirror 22.

The bottom panel 52 has a top surface 64 and a bottom surface 66 which preferably comprises an anti-skid fabric, such as a rubberized fabric, stitched or otherwise attached. During use, the anti-skid bottom surface 66, depending on the particular attachment configuration being employed, can contact the seat back top surface 28.

The support structure 50 additionally includes a diagonal support element 70 that can extend between the viewing panel rear surface 42 at an upper end 72 of the diagonal support element 70 and the top surface 64 of the bottom panel 52 at a lower end 74 of the diagonal support element 70. The diagonal support element 70 is employed in the "tether attachment" configuration of FIG. 4, and in the "tuck attachment" configuration of FIG. 6.

The diagonal support element 70 is removably attachable to the mirror and backing assembly 40 rear surface 42 or, as in the illustrated embodiment, to the bottom panel 52 top surface 64. In other words, either the upper end 72 of the diagonal support element 70 is capable of being repeatedly attached to and removed from the mirror and backing assembly 40 rear surface 42, or the lower end 74 of the diagonal support element 70 is capable of being repeatedly attached to and removed from the bottom panel 52 top surface 64.

In the illustrated embodiment, the diagonal support element 70 more particularly has its upper end 72 hingedly attached to the rear surface 42 on an upper portion 76 of the rear surface 42, and is accordingly permanently attached at its upper end 72. The support element 70 extends diagonally during use between the upper portion 76 and the top surface 64 of the bottom panel 52. The diagonal support element 70 at its lower end 74 has a flap 78. Secured to the underside of the flap 78 is a strip 80 of an element of a hook-and-loop fastener system, in particular the hook element. The top surface 64 of the bottom panel 52 is of a fabric pile material and serves as the "loop" element of the hook-and-loop fastener system at substantially any point along the top surface 64. The support element 70 generally comprises fabric surrounding a core of a soft plastic material such as plastic regrind, and is sufficiently stiff to provide structural integrity.

Accordingly, a portion of the support structure 50, in particular the bottom panel 52, can be entirely removed from the mirror and backing assembly 40 and stowed away, which is the case when the mirror 22 is attached to the front seat sun visor 26 as in FIGS. 1 and 7 or FIG. 8. Later, if desired, the bottom panel 52 can be reattached to the mirror and backing assembly 40, and the diagonal support element 70 reattached as well, so that the mirror 22 can again be attached generally near the rear seat 30 top surface 28 within the rear seating area 16 as in FIG. 4, 5 or 6.

Also attached or connected to the mirror and backing assembly 40 is an element 82 of a fastener also connected to the generally upper portion 76 of the rear surface 42, in the form of a D-ring 82. The D-ring 82 is employed in the "headrest attachment" configuration of FIG. 5.

Attached to and extending rearwardly from the bottom panel 52 is a tether strap 84 which is attachable to the fastener element 82, that is, to the D-ring 82, and is so depicted in FIG. 3. More particularly, at its free or distal end or portion 86, the tether strap 84 has a length adjustment buckle 88 and a fastener 90 in the form of a J-hook 90. The tether strap 84 and the J-hook 90 are employed during use of the mirror device 10 either in the "tether attachment" configuration of FIG. 4 or in the "headrest attachment" configuration of FIG. 5.

The bottom panel 52 also has an extending tail 98. At the distal end 100 of the extending tail 98, on the underside thereof, is a strip 102 of an element 102 of a hook-and-loop fastener system, such as the "hook" element 102. The extending tail 98 is employed during use of the mirror device 10 in the "tuck attachment" configuration of FIG. 6. In addition, the extending tail 98 and the "hook" element 102 may be employed in situations where the "hook" element 102 is attached to the rear of an automobile seat (configuration not illustrated).

As a front seating area attachment subsystem, additionally attached to the rear surface 42 of the mirror and backing assembly 40 are a pair of visor clip assemblies 110 and 112. Referring in particular to representative visor clip assembly 110, a visor clip base 114 is affixed to the rear surface 42 and has a pair of parallel end pieces 116 and 118. Extending between the end pieces 116 and 118 is the clip 120 itself, including a relatively fixed arm 122 and a relatively movable arm 124, with a pivot point 126. In addition, the base of the relatively fixed arm 122 is mounted to the visor clip base 114, in particular between the end pieces 116 and 114, for pivotal movement about a pivot point 128. There is a detent mechanism 130 connected between the clip 120 and the clip base 124 and cooperating with the pivot point 128 such that the clip 120 can be positioned and will remain at various angles with reference to the mirror and backing assembly 40, and thus with reference to said mirror 22, such as the two different angles depicted in FIG. 7 and in FIG. 8, respectively. The other visor clip assembly 112 has a substantially identical clip 132.

Figure 4:
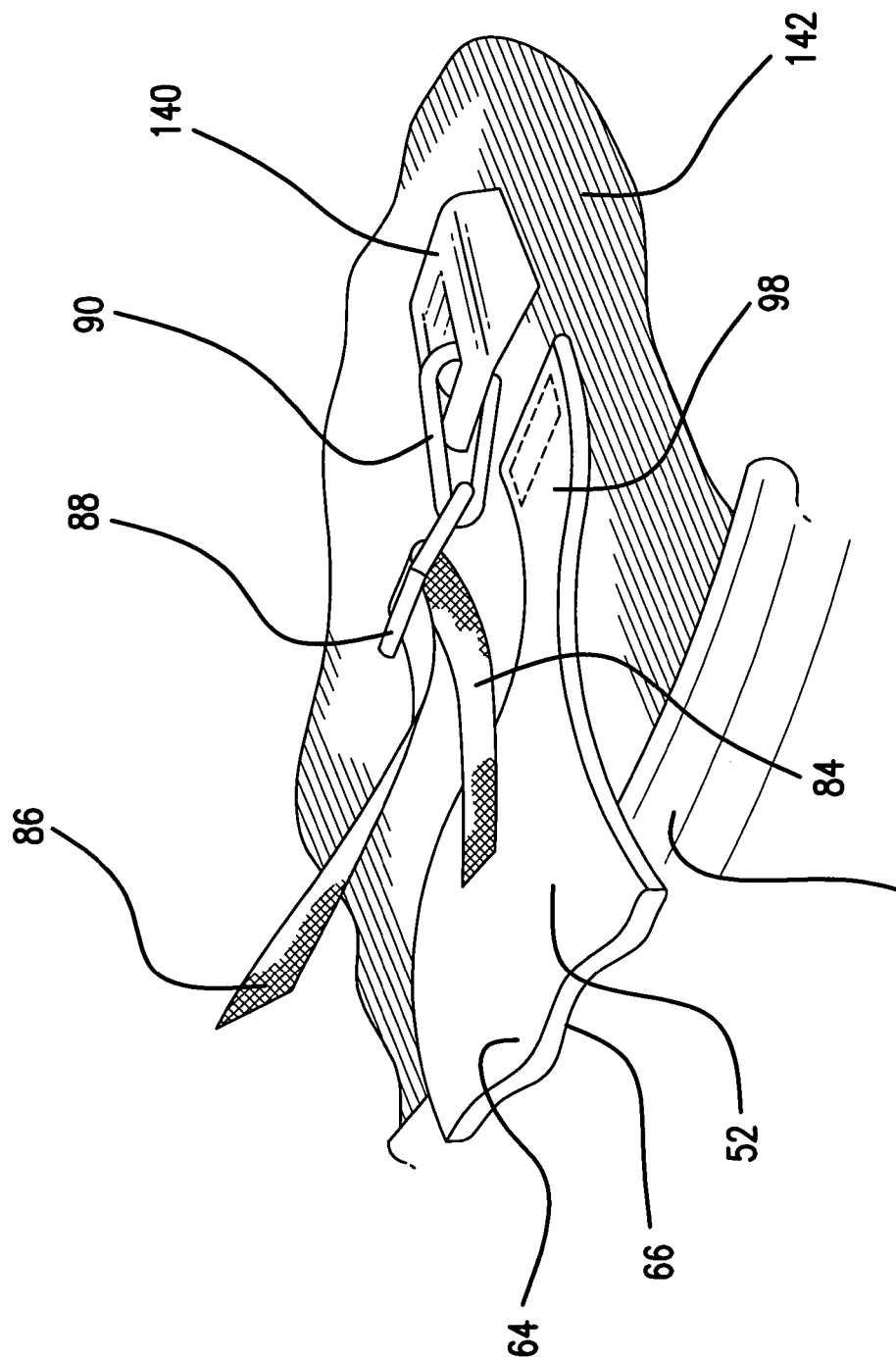
FIG. 4 represents attachment of the mirror device to the top tether anchorage point of a LATCH anchorage point system, and positioned near the top of the rear vehicle seat as in FIG. 2.

Considering now use of the mirror device 10, FIG. 4 illustrates the "tether attachment" configuration, which employs the top tether anchorage point 140 included in newer automobiles, as mandated by U.S. federal regulation, and particularly, through the National Highway Traffic Safety Administration (NHTSA), as part of the so-called LATCH anchorage point system (Lower Anchorage and Tethers for CHildren). The LATCH anchorage points are intended for use in combination with forward-facing child safety car seats.

In the "tether attachment" configuration represented in FIG. 4, the bottom panel 52 is placed over the top surface 28 of the rear seat 30 (FIG. 2), and the J-hook 90 is attached to the top tether anchorage point 140 on the vehicle rear shelf 142 (FIG. 4). In the "tether attachment" configuration of FIG. 4, the D-ring 82 is not employed, nor is the extending tail 98. The buckle 88 and the support structure 50, more particularly the support element 70 thereof, are adjusted so that the mirror 22 is in an appropriate position and at a suitable angle for viewing the infants using the vehicle's rear view mirror in a conventional manner. Although not illustrated in FIG. 4, the visor clip assemblies 110 and 112 are not employed in the "tether attachment" configuration represented in FIG. 4, although they remain present.

Figure 5:
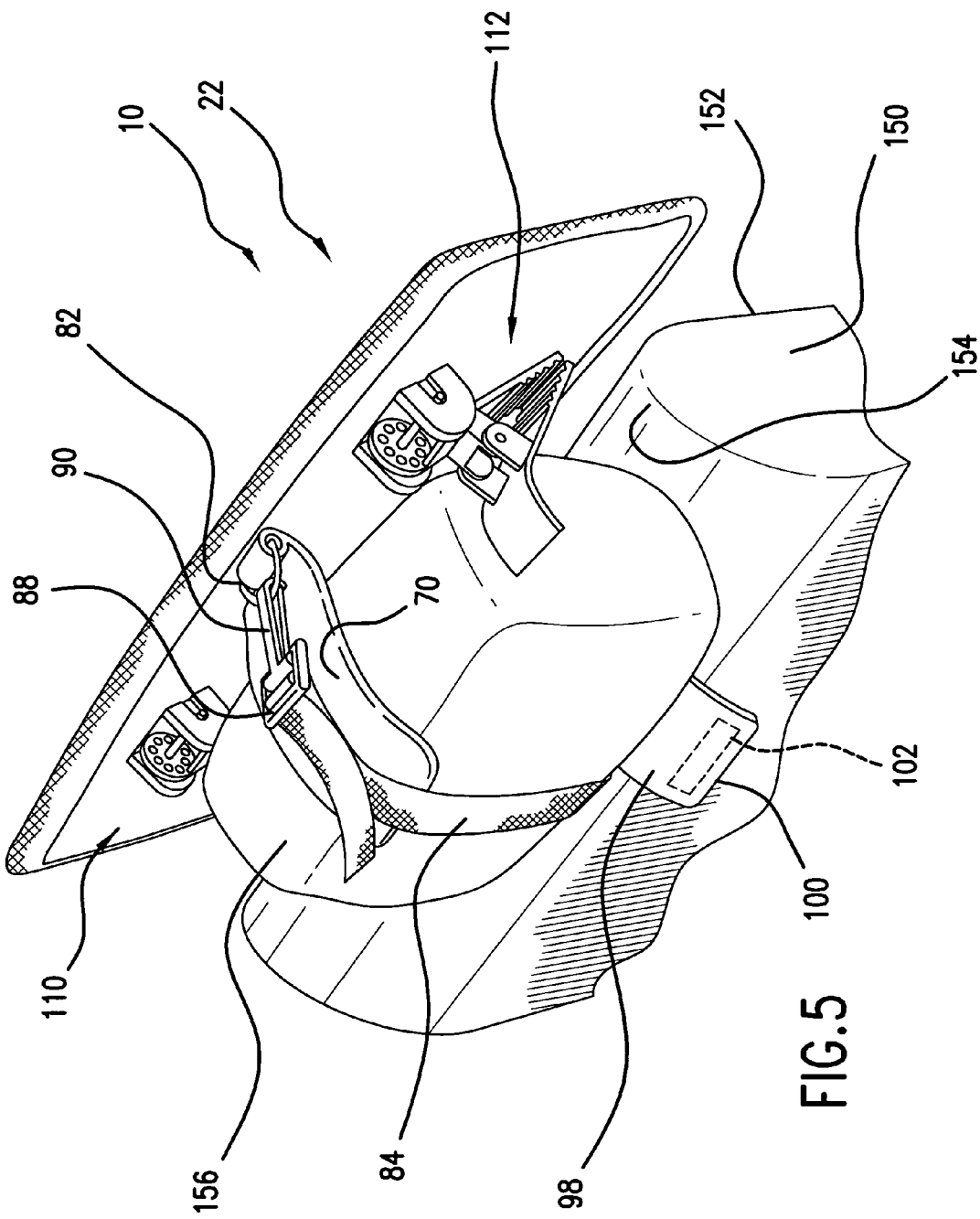
FIG. 5 depicts the mirror device embodying the invention employed in a headrest attachment configuration, again generally near the top of the rear seat of a motor vehicle for observation of one or more infants in rear facing child safety car seats.

FIG. 5 illustrates the mirror device 10 employed in the "headrest attachment" configuration. In FIG. 5, the mirror device 10 is employed in combination with a rearwardly-positioned vehicle seat 150, which may or may not be the rearmost seat in the vehicle. The seat 150 includes a seat back 152 having a top surface 154. In addition, the seat 150 has a headrest 156 positioned over the top surface 154. The bottom panel 52 is positioned over the top surface 154 of the seat back 152 between the top surface 154 and the headrest 156. The tether strap 84 is looped behind the headrest 156, and the J-hook 90 is attached to the D-ring 82. The effective length of the tether strap 84 is adjusted by means of the adjustment buckle 88 so that the mirror 22 is at a proper angle for viewing the infants. In the "headrest attachment" configuration of FIG. 5, the diagonal support element 70 is not employed, and can either lie on top of the headrest 156 as illustrated, or hang generally adjacent the rear surface 42. The visor clip assemblies 110 and 112 are not employed in the "headrest attachment" configuration of FIG. 5, although they remain present.

Figure 6:
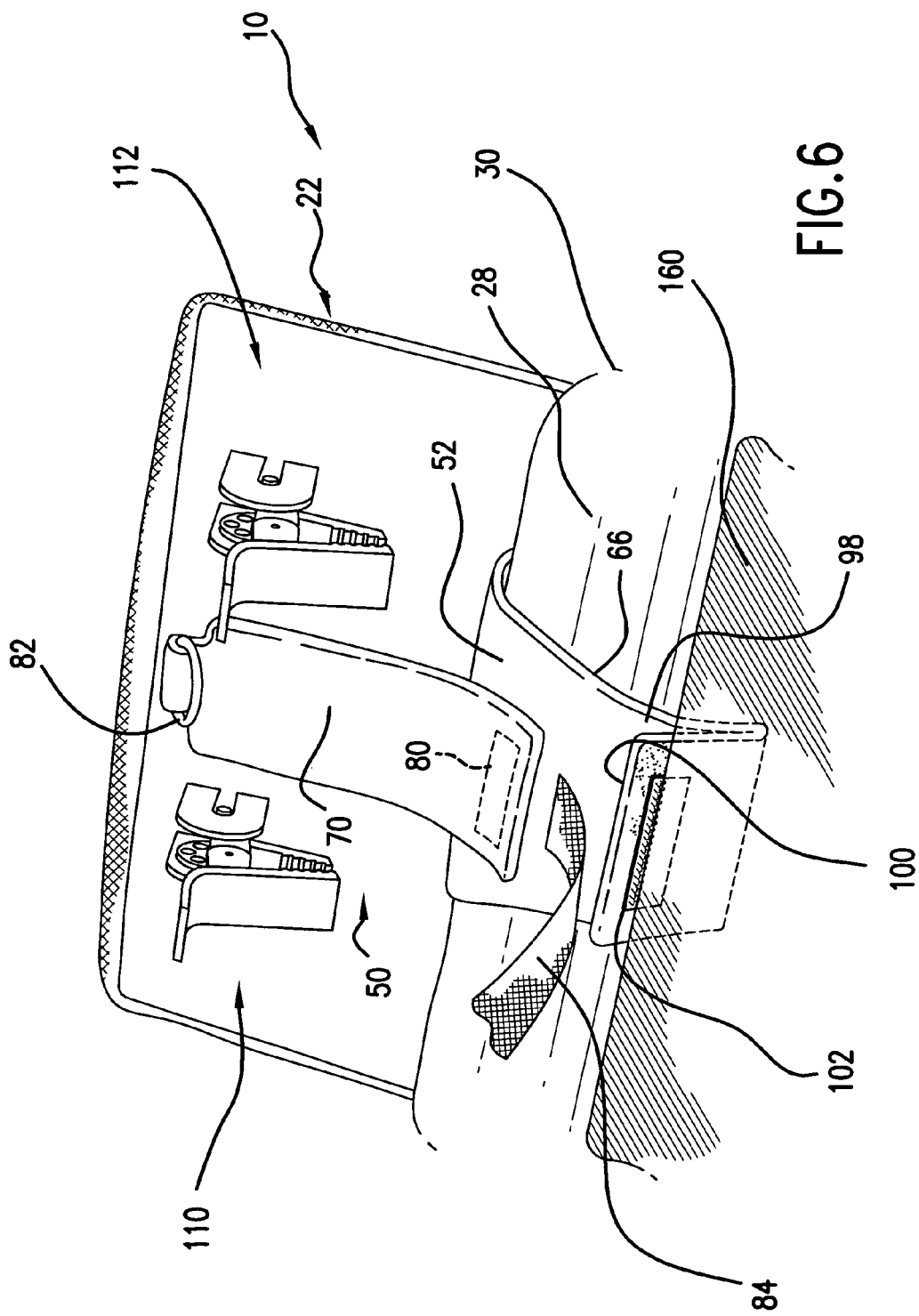
FIG. 6 is a rear perspective view of the mirror device in a "tuck attachment" configuration, again attached near the top of the rear seat of the automobile for observation of one or more infants in rear-facing child safety car seats.

FIG. 6 illustrates the mirror device 10 in the "tuck attachment" configuration. The bottom panel 52 is placed over the top surface 28 of the rear seat 30. The extending tail 98 of the bottom panel 52 is folded and tucked in between the vehicle rear seat 30 back and the vehicle rear shelf 160, and held by friction aided by the anti-skid fabric on the bottom surface 66 of the bottom panel 52. The support structure 50, more particularly the diagonal support element 70 thereof, is adjusted, in combination with the particular point at which the fabric of the extending tail 98 is tucked in between the vehicle rear seat 30 back and the vehicle rear shelf 160, so that the mirror 22 is positioned at an appropriate angle for viewing the infant. In the "tuck attachment" configuration of FIG. 6, the D-ring 82 is not employed, nor is the tether strap 84 with its J-hook 90. In addition, in FIG. 6, the visor clip assemblies 110 and 112 are not employed, although they remain present.

As noted above, a particular feature or advantage of the mirror device 10 is what may be termed the "Grow With Me" feature. Thus, the mirror device 10 can initially be employed with young infants in rear-facing child safety car seats as generally described hereinabove with reference to FIGS. 2, 4, 5 and 6. Later, as a child becomes older and is seated in the vehicle rear seat 30 in a forward-facing position, the mirror device 10 can be clipped to the vehicle front seat sun visor 26 as generally described hereinbelow with reference to FIGS. 1, 7 and 8.

More particularly, as illustrated in FIG. 1 and in the cross-section of FIG. 7, the mirror device 10 is attached by means of the visor clip assemblies 110 and 112 to the distal edge 170 of the visor 26 as the visor 26 hangs down. In this configuration, the bottom panel 52 is removed, leaving only one set 58 of interlocking teeth of the zipper 56 (FIG. 3). The support element 70 remains, but is positioned flat against the fabric rear surface 42, and retained by means of the "hook" element 80 fastening material.

In FIG. 7, the detent mechanism 130 rotating about the pivot point 128 is adjusted so that the clips, such as the clip 132, are generally parallel to the mirror and backing assembly 40.

Referring finally to FIG. 8, the mirror device 10 is shown attached to the front seat sun visor 26 in the visor up position. Again, the mirror device 10 is attached by means of the visor clip assemblies 110 and 112 to the distal edge 160 of the visor 26. In this case, the detent mechanism 130 is adjusted so that the clips such as the clip 120 are closer to a right angle with reference to the mirror device 10.

While a particular embodiment of the invention has been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. A mirror device for use inside a vehicle including a front seating area, a rear seating area, a sun visor within the front seating area, and a rear seat within the rear seating area, the rear seat having a top surface, said mirror device comprising:
   a mirror having a reflective front surface and a rear surface; and
   a two-position attachment system including a front seating area attachment subsystem for attaching said mirror to the sun visor within the front seating area and a rear seating area attachment subsystem for attaching said mirror generally near the rear seat top surface within the rear seating area, said front seating area attachment subsystem including at least one element which is not common to said rear seating area attachment subsystem.

2. The mirror device of claim 1, wherein said front seating area attachment subsystem includes at least one clip assembly for attaching said mirror to the sun visor.

3. The mirror device of claim 2, wherein said clip assembly is configurable so as to attach said mirror to a distal edge of the sun visor in a sun visor up position.

4. The mirror device of claim 2 wherein said clip assembly is configurable so as to attach said mirror to a distal edge of the sun visor in a sun visor down position.

5. The mirror device of claim 2, wherein said clip assembly is configurable so as to attach said mirror to a distal edge of the sun visor in either a sun visor up position or a sun visor down position.

6. The mirror device of claim 5, wherein said clip assembly comprises:
   a clip base affixed to said mirror rear surface;
   a clip connected to said clip base at a pivot point; and
   a detent mechanism connected between said clip and said clip base and cooperating with said pivot point such that said clip can be positioned and will remain at various angles with reference to said mirror.

7. The mirror device of claim 2, wherein said clip assembly comprises:
   a clip base affixed to said mirror rear surface;
   a clip connected to said clip base at a pivot point; and
   a detent mechanism connected between said clip and said clip base and cooperating with said pivot point such that said clip can be positioned and will remain at various angles with reference to said mirror.

8. The mirror device of claim 1, wherein said rear seating area attachment subsystem includes a mirror support structure having a panel which is employed when said mirror is attached generally near the rear seat top surface within the rear seating area, said panel capable of being repeatedly attached to and removed from said mirror.

9. The mirror device of claim 8, wherein:
   said support structure panel comprises a bottom panel having a top surface and a bottom surface that can contact the seat back top surface; and which further comprises:
   a diagonal support element that extends between said mirror rear surface at an upper end of said diagonal support element and said bottom panel top surface at a lower end of said diagonal support element, either said upper end of said diagonal support element capable of being repeatedly attached to and removed from said mirror rear surface or said lower end of said diagonal support element capable of being repeatedly attached to and removed from said bottom panel top surface.

10. The mirror device of claim 8 which further comprises a tether strap extending from said support structure panel, said tether strap terminating in a fastener that can be attached to a top tether anchorage point intended for attachment to the top tether of a forward-facing child safety seat in vehicles so equipped.

11. The mirror device of claim 8, which further comprises:
   an element of a fastener connected to a generally upper portion of said rear surface of said mirror; and
   a tether strap extending from said support structure panel, said tether strap having a free end that is attachable to said element of a fastener when said tether strap is looped around a headrest in vehicles so equipped to enable said mirror to be secured to the headrest.

12. The mirror device of claim 8, wherein said support structure panel has an extending tail which can be tucked in between the vehicle seat back and the rear shelf for frictional engagement in vehicles configured with a rear shelf behind the seat back.

13. A mirror device for use inside a vehicle including a front seating area, a rear seating area, a sun visor within the front seating area, and a rear seat within the rear seating area, the rear seat having a top surface, said mirror device comprising:
   a mirror having a reflective front surface and a rear surface; and
   an attachment system including, for alternative use, at least one clip assembly for attaching said mirror to the sun visor, and a mirror support structure panel employed for attaching said mirror generally near the rear seat top surface within the rear seating area, said clip assembly not being employed when attaching said mirror generally near the rear seat top surface within the rear seating area, said mirror support structure panel not being employed when attaching said mirror to said sun visor.

14. The mirror device of claim 13, wherein said clip assembly is configurable so as to attach said mirror to a distal edge of the sun visor in either a sun visor up position or a sun visor down position.

15. The mirror device of claim 13, wherein said clip assembly comprises:
   a clip base affixed to said mirror rear surface;
   a clip connected to said clip base at a pivot point; and
   a detent mechanism connected between said clip and said clip base and cooperating with said pivot point such that said clip can be positioned and will remain at various angles with reference to said mirror.

16. A mirror device for use inside a vehicle including a front seating area, a rear seating area, a sun visor within the front seating area, and a rear seat within the rear seating area, the rear seat having a top surface, said mirror device comprising:
   a mirror having a reflective front surface and a rear surface; and
   an attachment system including, for alternative use, at least one clip assembly for attaching said mirror to the sun visor, and a mirror support structure panel employed for attaching said mirror generally near the rear seat top surface within the rear seating area, said mirror support structure panel capable of being repeatedly attached to and removed from said mirror, and said clip assembly not being employed when attaching said mirror generally near the rear seat top surface within the rear seating area.

17. The mirror device of claim 16, wherein:
   said support structure panel comprises a bottom panel having a top surface and a bottom surface that can contact the seat back top surface; and which further comprises:
   a diagonal support element that extends between said mirror rear surface at an upper end of said diagonal support element and said bottom panel top surface at a lower end of said diagonal support element, either said upper end of said diagonal support element capable of being repeatedly attached to and removed from said mirror rear surface or said lower end of said diagonal support element capable of being repeatedly attached to and removed from said bottom panel top surface.

18. The mirror device of claim 16 which further comprises a tether strap extending from said support structure panel, said tether strap terminating in a fastener that can be attached to a top tether anchorage point intended for attachment to the top tether of a forward-facing child safety seat in vehicles so equipped.

19. The mirror device of claim 16, which further comprises:
   an element of a fastener connected to a generally upper portion of said rear surface of said mirror; and
   a tether strap extending from said support structure panel, said tether strap having a free end that is attachable to said element of a fastener when said tether strap is looped around a headrest in vehicles so equipped to enable said mirror to be secured to the headrest.

20. The mirror device of claim 16, wherein said support structure panel has an extending tail which can be tucked in between the vehicle seat back and the rear shelf for frictional engagement in vehicles configured with a rear shelf behind the seat back.

* * * * *